United States Patent Office 3,723,184
Patented Mar. 27, 1973

3,723,184
COMPRESSION CELL CLOSURE
Robert E. Stark and Douglas W. Walker, Littleton, Colo., assignors to The Gates Rubber Company, Denver, Colo.
Filed Dec. 11, 1970, Ser. No. 97,209
Int. Cl. H01m 1/02
U.S. Cl. 136—133                        6 Claims

ABSTRACT OF THE DISCLOSURE

A battery cell closure is described comprising: (1) a cell container having alternate upstanding projections and depressions along the inner sidewall of its mouth portion, (2) a top closure for the cell container, and (3) a compressible insulating and sealing annular polymeric ring engaging and interposed between the top closure and cell container. The seal is effected by radially compressing the mouth of the cell container inwardly toward its longitudinal axis. The annular ring is made to flow into the depressions of the container inner sidewall and form the seal.

BACKGROUND OF THE INVENTION

This invention relates to fluid tight closures for battery containers and particularly to alkaline battery cell containers.

It has long been known that battery cells, particularly alkaline cells, may be sealed by compression of an annular electrolyte resistant sealing ring interposed between the battery cell container (which may serve as one terminal of the battery), and a top closure (which may serve as the opposite terminal). While this technique has been more or less successful, it has generally required the inclusion of a special ledge or seat inside the mouth of the cell container to receive the insulating and sealing ring. Provision of such a ledge generally requires an additional manufacturing step. Furthermore, it has been one notable disadvantage in these seals that upon application of a radial force, such as effected by crimping, the sealing ring often has a tendency to undergo longitudinal displacement which often results in an ineffective seal. The sealing gasket in such cases tends to become skewed away from its seat or even pop out of the cell entirely. The overall problem is amplified in the case of alkaline cells because of the extreme tendency or alkaline electrolyte to wet and creep along any closure interface.

Pertinent prior art may be found in relevant subclasses of U.S. Patent Office Classification 136, Batteries. The closest prior art known to the applicant includes U.S. Letters Patents Nos. 2,571,616; 2,712,565; 3,068,313; 3,069,489 and 3,433,681.

It is an object of this invention to provide an annular sealing ring for a battery cell container in which there is no need for special provision of a ledge or seat to receive the sealing ring.

It is another object of this invention to provide a sealing ring which substantially does not undergo longitudinal displacement upon crimping the cell and sealing ring about the top closure of the cell.

It is another object to provide a sealing and insulating ring for a battery cell container which is characterized by a high degree of reliability and is manufactured and implemented within the battery cell at a relatively low cost.

These and other objects of the invention are met and the disadvantages of the prior art overcome by employing the novel sealing means of the present invention as more particularly described hereinafter.

SUMMARY OF THE INVENTION

Briefly described, the present invention details a sealing closure means for a cylindrical battery cell container comprising a compressible insulating and sealing polymeric ring interposed between an inwardly disposed top closure and the outwardly disposed mouth portion of the cell container along its inner sidewall. The inner sidewall of the mouth of the container is provided with a plurality of grooves or depressions, which in turn create contiguous upstanding projections, which intimately receive the compressible sealing ring upon crimping of the container mouth radially inwardly toward the longitudinal axis of the battery cell. Flow of the sealing ring into the groove substantially prevents longitudinal displacement of the sealing ring and provides a reliable seal.

BRIEF DESCRIPTION OF THE DRAWINGS

The invention will be more readily understood by reference to the accompanying drawings, in which like numerals designate like parts in the several figures, and wherein.

PREFERRED EMBODIMENTS OF THE INVENTION

Figure 1:
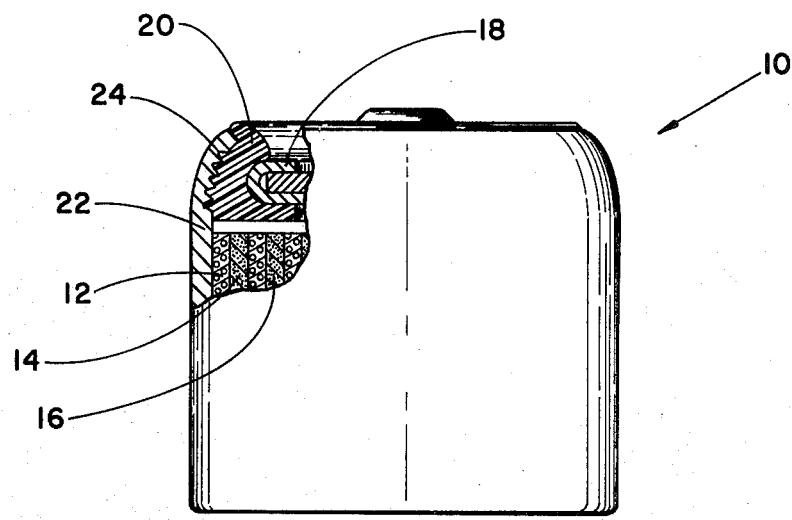
FIG. 1 is a partial cut-away elevational view of a completed battery cell having the closure means of the present invention.

In FIG. 1, a battery cell designated at 10 is comprised of an interior cell pack consisting of alternate separator layers 12, positive plate 14 and negative plate 16 in a spirally wound configuration. The cell has a top closure (equipped with a resealable safety valve not shown) having a rounded marginal or peripheral portion 18 which fits snugly in a groove provided in the plastic compressible insulating and sealing ring 20. Cell wall container 22 is supplied with serrations and circumferential grooves 24 about its inner sidewall. The use of a radial compressive force, e.g. by crimping, allows the sealing ring material 20 to intimately flow into the contour of the circumferential grooves 24 thereby preventing longitudinal displacement of the sealing ring 20 both during the crimping operation and thereafter.

Figure 2:
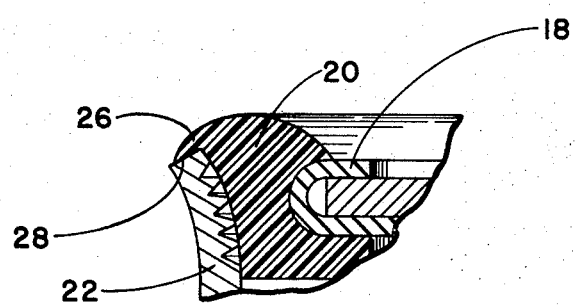
FIG. 2 is an enlarged elevational view depicting the closure means of the present invention prior to application of a radial force used to effect the final closure as shown in FIG. 1.

In FIG. 2, the detailed view of the cell closure of the present invention is shown prior to crimping. Sealing ring 20 is provided with a protruding overhang 26 which rests on the upper edge 28 of flared metal container wall 22. Upon crimping, the overhang extends above the wall 22 to provide further insulative protection between the battery terminals. Flaring of the container serves to facilitate loading of the cell contents as well as to minimize torque-producing longitudinal components of force which would tend to place the sealing ring in shear or strain upon crimping. Although not narrowly critical, it is preferred that the marginal portion of the closure top 18 forms a substantially rounded or smooth surface. In this manner, mutual forces exerted between sealing ring 20 and said rounded edge 18 are more uniform and act along a larger surface to minimize pressure gradients.

Figure 3:
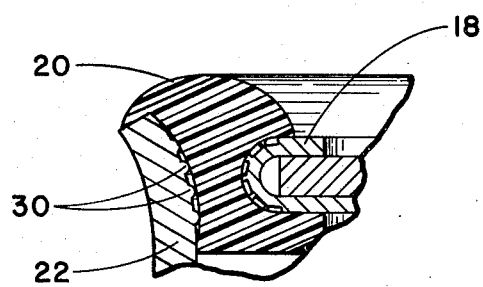
FIG. 3 depicts a modification of the closure configuration shown in FIG. 2.

As shown in FIG. 3, the alternate upstanding projections and depressions may be provided by a plurality of embossments 30. Other means for producing alternate projections and grooves may be utilized and are within the scope of this invention. For instance, discontinuous indentations or embossments (e.g. bumps) may be employed. Furthermore, it is an alternative embodiment that the top closure 18 made of metal may also be provided with alternate upstanding projections and depressions to accept flow of the sealing ring 20 upon crimping of the sidewall 22 as shown in FIG. 3.

A variety of materials may be used for the sealing ring 20, including but not limited to synthetic polymers such as nylon, polypropylene, ABS (copolymers made from acrylonitrile, butadiene and styrene), cross-linked polyethylene, vinyls, polysulfones and polyphenylene oxides. In general, the material should be resistant to cold flow, i.e. creepage or gradual deformation when subjected to a constant load. Furthermore, the material should be a good insulator; i.e. having low electrical conductivity and further should be substantially resistant to attack by cell fluids in which the sealing material 20 may come into contact. The above-mentioned list of materials is especially suitable in alkaline cells where resistance to potassium hydroxide or similar electrolyte is required.

The sealing ring of the present invention is also capable of accepting a coating of sealant such as asphalt, vinyls, or polyethylenes.

It should be understood that the invention is capable of a variety of modifications and variations which will become apparent to those skilled in the art upon reading of the present specification and these are to be included within the scope of the claims appended hereto.

What is claimed is:

1. In an alkaline galvanic cell having current generating means enclosed by a metal container serving as one terminal of the cell and a circular metal top closure insulatingly disposed in the mouth of said container and serving as the other terminal of the cell, the improvement comprising in combination:

a compressible insulating and sealing annular plastic ring resistant to cold flow and engaging said top closure at its outermost marginal edge surface, said outermost marginal edge surface of the top closure being provided with a plurality of alternate upstanding projections and depressions to inhibit axial movement of the top closure;

a container having a mouth and along the inner sidewall of said mouth a non-smooth surface having alternate upstanding projections and depressions;

said mouth of said container being displaced radially inwardly toward its longitudinal axis, thereby sealing the cell by compressing the annular ring into the depressions of the container inner sidewall and top closure outermost marginal edge surface.

2. A method for sealing a circular top closure member into an open-mouthed cylindrical electrochemical cell container comprising the steps of:

(a) flaring the mouth of said container;

(b) providing the inner sidewall of said container mouth with a plurality of alternate depressions and projections;

(c) inserting a compressible insulating and sealing annular polymeric ring having an overhang portion into said container mouth, said overhang portion seating upon the edge of the container mouth;

(d) engaging said top closure member within said annular polymeric ring; and (e) compressing said flared mouth radially inwardly sufficiently to thereby compress the annular ring and cause a portion of the annular ring to flow into said depressions of the container side wall to form a fluid tight seal.

3. The method of claim 2 wherein the marginal portions of said top closure are rounded to form a first curvature, and wherein said container at its mouth portion carrying said alternate depressions and projections has been radially inwardly displaced sufficiently to form a second curvature, said first and second curvatures both being concave with respect to the axis of the cell and spaced generally radially opposite one another.

4. The method of claim 2 wherein the annular polymeric ring is selected from the group consisting of nylon, polypropylene, copolymers made from acrylonitrile/butadiene/styrene, cross-linked polyethylene, vinyls, polysulfones and polyphenylene oxides.

5. The method of claim 2 wherein the annular polymeric ring is made of nylon.

6. The method of claim 2 wherein the depressions in the container mouth are provided by one or more circumferential grooves formed therein.

References Cited

UNITED STATES PATENTS

| | | | |
|---|---|---|---|
| 3,061,660 | 10/1962 | Schenk | 136—169 |
| 1,295,122 | 2/1919 | Chamberlain | 136—133 |
| 3,069,489 | 12/1962 | Carmichael et al. | 136—133 |
| 3,554,813 | 1/1971 | Feldhake | 136—133 |
| 3,484,301 | 12/1969 | Gray | 136—133 |

FOREIGN PATENTS

| | | | |
|---|---|---|---|
| 1,338,353 | 8/1963 | France | 136—133 |

DONALD L. WALTON, Primary Examiner

U.S. Cl. X.R.

136—175